US008674969B2

(12) United States Patent
Ooga

(10) Patent No.: US 8,674,969 B2
(45) Date of Patent: Mar. 18, 2014

(54) LIQUID CRYSTAL DISPLAY DEVICE, AND TIMING CONTROLLER AND SIGNAL PROCESSING METHOD USED IN SAME

(75) Inventor: Kouichi Ooga, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 490 days.

(21) Appl. No.: 12/721,264

(22) Filed: Mar. 10, 2010

(65) Prior Publication Data

US 2010/0231559 A1 Sep. 16, 2010

(30) Foreign Application Priority Data

Mar. 11, 2009 (JP) ................................. 2009-058758
Feb. 9, 2010 (JP) ................................. 2010-026981

(51) Int. Cl.
*G06F 3/038* (2013.01)

(52) U.S. Cl.
USPC ................ 345/204; 345/87; 345/98; 345/173

(58) Field of Classification Search
USPC ........................ 345/87–89, 98, 104, 173, 204
See application file for complete search history.

(56) References Cited

U.S. PATENT DOCUMENTS 5,615,376 A * 3/1997 Ranganathan ................ 713/322
5,945,973 A * 8/1999 Sakai et al. ................... 345/104
6,049,318 A 4/2000 Ota
6,768,498 B1 * 7/2004 Kim ............................. 345/698
7,576,731 B2 * 8/2009 Okazaki ........................ 345/173
7,999,800 B2 * 8/2011 Iwabuchi et al. ............. 345/204
2001/0052887 A1 * 12/2001 Tsutsui et al. .................. 345/87
2002/0175887 A1 * 11/2002 Yamazaki ....................... 345/87
2003/0030607 A1 * 2/2003 Kitagawa et al. ............... 345/87
2004/0036669 A1 * 2/2004 Yanagi et al. .................. 345/98
2004/0100450 A1 * 5/2004 Choi ............................ 345/173

FOREIGN PATENT DOCUMENTS

| | | | |
|---|---|---|---|
| CN | 1317779 | A | 10/2001 |
| CN | 1516102 | A | 7/2004 |
| JP | 05-204336 | A | 8/1993 |
| JP | 06-046361 | A | 2/1994 |
| JP | 9-154087 | A | 6/1997 |
| JP | 09-190164 | A | 7/1997 |
| JP | 10-010489 | A | 1/1998 |

(Continued)

OTHER PUBLICATIONS

Office Action issued by Chinese Patent Office in Chinese Application No. 201010136814.X dated Dec. 27, 2012.

(Continued)

*Primary Examiner* — Gregory J Tryder
(74) *Attorney, Agent, or Firm* — Sughrue Mion, PLLC

(57) ABSTRACT

A liquid crystal device is provided which is capable of being free from degradation of signal receiving sensitivity and/or malfunction without performing thinning-out and complementing on video signals of an electronic device having an embedded peripheral circuit to receive and transmit data. A stop period during which outputting of horizontal synchronizing signal made up of a video signal strobe signal STB and vertical drive clock signal VCK is stopped at least one time or more and for two horizontal periods or more during a display period in one vertical period is set by a control device (for example, timing controller). In this horizontal synchronizing stop period setting mode processing, a first signal (for example, status signal) indicating that the outputting of the horizontal synchronizing signal is in a stop state is transmitted to an electronic circuit (for example, peripheral circuit).

18 Claims, 10 Drawing Sheets

(56) References Cited

FOREIGN PATENT DOCUMENTS

| | | | |
|---|---|---|---|
| JP | 2002-182619 | A | 6/2002 |
| JP | 2002-366108 | A | 12/2002 |
| JP | 2005-234139 | A | 9/2005 |
| JP | 2007-192982 | A | 8/2007 |
| JP | 2009-109955 | A | 5/2009 |

OTHER PUBLICATIONS

Japanese Office Action issued Jul. 30, 2013 in corresponding Japanese Patent Application No. 2010-026981.

* cited by examiner (Liquid crystal display device having 1200 pieces of scanning lines)

(Liquid crystal display device having 1200 pieces of scanning lines)

LIQUID CRYSTAL DISPLAY DEVICE, AND TIMING CONTROLLER AND SIGNAL PROCESSING METHOD USED IN SAME

INCORPORATION BY REFERENCE

This application is based upon and claims the benefit of priorities from Japanese Patent Application No. 2009-058758, filed on Mar. 11, 2009 and Japanese Patent Application No. 2010-026981, filed on Feb. 9, 2010, the disclosures of which are incorporated herein in its entirely by reference.

BACKGROUND OF THE INVENTION

1. Field of the Invention

The present invention relates to a liquid crystal display device, and a timing controller and signal processing method to be used in the same and more particularly to the liquid crystal display device, and the timing controller and signal processing method to be suitably employed when an electronic device to receive and transmit data such as a circuit board having a position detection function is mounted in an interior of or in an area surrounding a liquid crystal panel.

2. Description of the Related Art

In a thin-type display device such as a liquid crystal display device and plasma display device, as resolution of a display panel becomes higher in recent years, a transmission frequency of a video signal "in" a display device also becomes higher. In response to the need for higher-speed moving picture display, a frame frequency is set to, for example, 120 Hz, thus causing a frame rate to become higher. Particularly, in the liquid crystal display device, writing is performed by the application of a voltage to a pixel of a liquid crystal panel to control a gray level for displaying, however, at the time of the voltage application to the pixel, a change in current occurs, which causes the emission of electromagnetic noise in an area surrounding the liquid crystal panel. In the liquid crystal display device, writing is done on every line of the liquid crystal panel and, therefore, the electromagnetic noise occurs by an amount corresponding to vertical resolution of the liquid crystal panel for one frame period. Moreover, an increase in added value of the display device is also required and, to achieve this aim, there are some cases where an additional circuit board having, for example, a position detecting function has to be mounted in the interior of or in an area surrounding the liquid crystal panel.

The liquid crystal display device of this kind, as shown in, for example, FIG. 8, is chiefly made up of a liquid crystal panel 1, a data driving section 2, a gate driving section 3, and a timing controller 4. In a location near to the liquid crystal panel 1, a peripheral circuit 5 configured to receive and transmit data is mounted. The liquid crystal panel 1 includes data electrodes Xi (i=1, 2, . . . , m, for example, m=1600), scanning electrodes Yj (j=1, 2, . . . , n, for example, n=1200), pixels Spi,j, and common electrodes COM. To each of the data electrodes Xi is applied a voltage corresponding to pixel data Di. To each of the scanning electrodes Yj is supplied a scanning signal Gj in a predetermined order. Each of the pixels SPi,j is mounted at the intersection of each of the data electrodes Xi and scanning electrodes Yj and is made up of a TFT (Thin Film Transistor) Q, a holding capacitor Cst, a liquid crystal layer C1*c*, and a common electrode COM. The holding capacitor Cst holds a voltage corresponding to an applied pixel data Di. The liquid crystal layer C1*c* shows diagrammatically a liquid crystal layer to display a pixel of a gray level corresponding to the pixel data Di. To the common electrode COM is applied a common voltage.

The data driving section 2 writes pixel data Di corresponding to a video signal "vf" to each of data electrodes Xi based on a video signal strobe signal STB (hereinafter, also referred to as "STB signal") provided for every one horizontal (1H) period and drives the liquid crystal panel 1 with AC (Alternating Current) current in a predetermined manner based on a polarity inversion control signal POL (hereinafter, also referred to as "POL signal") provided for every one horizontal (1H) period. In this case, the data driving section 2 alternately inverts the phase of the common voltage to be applied to the common electrode COM for every one dot and for every frame (between an odd-numbered frame and an even-numbered frame), for example, in a manner to correspond to the dot inversion driving method, or alternately inverts the phase of the voltage to be applied to the data electrode Xi for every one dot and for every frame (between the odd-numbered frame and the even-numbered frame). The gate driving section 3 outputs a scanning signal Gj that synchronizes to a vertical synchronizing pulse signal VSP (hereinafter, also referred to as "VSP signal") provided for every one vertical (1V) period and drives each scanning electrode Yj in a predetermined order based on a vertical drive clock signal VCK (also called a Vertical Clock, accordingly, hereinafter, also referred to as "VCK signal") provided for every one horizontal (1H) period. The timing controller 4 has a video signal processing section 4*a* and a horizontal/vertical synchronization control signal outputting section 4*b*. The video signal processing section 4*a* receives a video signal "in" and data valid period signal DE (hereinafter "DE signal") and performs the sorting of signals and setting of a transmission voltage amplitude. The horizontal/vertical synchronization control signal outputting section 4*b* outputs the STB signal and the POL signal to the data driving section 2 and also outputs the VSP signal, the vertical drive clock signal VCK (or called a Vertical Clock, hereinafter "VCK signal"), a gate mask signal GOE (also called a Gate Output Enable, accordingly, hereinafter also referred to as "GOE signal") to the gate driving section 3.

FIG. 9 is a diagram explaining each signal shown in FIG. 8. As shown in FIG. 9, the VSP signal is a reference signal to determine a frame speed of the liquid crystal panel 1 and its one cycle makes up one vertical period (1V period). The VCK signal is a clock signal to drive the gate driving section 3 during a display period d and its one cycle makes up one horizontal period (1H period). The GOE signal is used to mask an output from the gate driving section 3 and, for example, when this signal is at a low level (L), the scanning signal Gj is allowed to be outputted and, when this signal is at a high level (H) the scanning signal Gj is not allowed to be outputted. The STB signal is used to write the pixel data Di having a voltage corresponding to a gray level of the video signal "in" to the pixel SPi,j of the liquid crystal panel 1. The POL signal is used to control polarity when the pixel data Di is written to the liquid crystal display panel 1. By controlling this signal, dot inversion driving or 1H2V inversion driving is performed. Based on each of these signals, each of the scanning electrodes Yj is sequentially scanned by the gate driving section 3 and the pixel data Di having a voltage corresponding to a gray level of the video signal "in" to be written to the pixel SPi,j of the liquid crystal panel 1, thus causing a video image corresponding to the video signal "in" is displayed on the liquid crystal panel 1.

However, in such a liquid crystal display device as a first related art, there are some cases where, at the time of writing a voltage to the pixel SPi,j of the liquid crystal panel 1, if deviation of a drain voltage of a TFT among lines becomes large. (for example, such a case where, at the time of dot inversion driving, a longitudinal dot stripe is displayed), an amount of current flowing through the common electrode COM becomes large. At this point of time, noises caused by the current changes of the common electrode COM occur in an area surrounding the liquid crystal panel 1. If display causing the deviation of the drain voltage to become large among lines is performed, for example, in such a case where the longitudinal dot stripe is displayed at the time of the dot inversion driving as described above, noises caused by the current changes of the common electrode COM are generated every time when a voltage corresponding to a gray level of a video signal is written to the liquid crystal display panel 1, that is, the noises occur in every one horizontal (1H) cycle. Further, in some cases, when the liquid crystal display device is operated in a charge collection mode, as shown in FIG. 9, noises occur even at the timing of the charge collection.

As shown in FIG. 8, there is a case where a peripheral circuit 5 for receiving and transmitting data is mounted in an area surrounding the common electrode COM of the liquid crystal display device 1. Its example is a position coordinate detecting device using a liquid crystal display device as a digitizing tablet in which a change of an electromagnetic field is employed as a signal for the data receiving and transmitting. However, in the peripheral circuit 5, when a noise occurs at the time of receiving and transmitting data and, if a cycle of the occurrence of noise is shorter than the period required for receiving and transmitting data, the noise interferes with the transmission and receipt of the data, thus causing the occurrence of degradation of sensitivity for receiving data and/or malfunction in some cases. That is, the problem arises that, when a display causing variation of a drain voltage to become large among lines is performed, noises caused by writing to the pixel SPi,j of the liquid crystal panel 1 occur in the 1H cycle and, if the period for receiving and transmitting data in the peripheral circuit 5 is longer than the 1H period, the peripheral circuit 5 is always influenced by the noises caused by the writing to the pixel Spi,j, which causes the sensitivity of receiving data to be lowered and further a malfunction to occur.

A general method for suppressing the occurrence of noises from the liquid crystal panel 1 is to shield the noise generating source by a metal material or the like to separate a noise loop or to trap noises. However, a problem arises here in that, in a position coordinate detecting device using a change in electromagnetic field as a signal for receiving and transmitting data, when the liquid crystal panel 1 is shielded by the metal material, though noises from the liquid crystal panel 1 can be shielded against noises, the change in electromagnetic field to be used for its original function of detecting the position coordinate cannot be recognized. For example, in the case of a display device in which one pointer (cursor) is displayed on a display screen of the liquid crystal display panel 1 and the liquid crystal panel 1 is traced by a pointer recognizing device (for example, a touch pen) and the pointer moves by following the movement of the pointer recognizing device, in order to move the pointer on the display screen by making the pointer recognizing device follow, the pointer recognizing device has to provide the information about where the pointer recognizing device is positioned to the display device (for detection of position coordinates) and, based on this information, the pointer is moved on the display device.

Thus, in the case where the position coordinate detecting device operates by using a change in electromagnetic field, if the liquid crystal panel 1 is shielded by the metal material, the position coordinate detection signal itself is also shielded. Therefore, the method for shielding the liquid crystal panel 1 cannot be employed in the above display device and other measures must be taken. Further, it is assumed that, as resolution of a display device becomes higher and as higher-speed operation of the display panel is widely applied, timing of the occurrence of noises caused by writing of a voltage to pixels of the liquid crystal panel 1 become higher-speed (that is, the 1H period becomes short and a cycle of noise occurrence also becomes short) and, as a result, there increase fears that the above problem is more apparent. Consequently, the advent of a liquid crystal display device is expected in which degradation of signal receiving sensitivity and/or malfunction occurs in such a circuit board having a peripheral circuit for receiving and transmitting of data.

Besides the above liquid crystal display device, a display control device as a second related art of this kind is disclosed in, for example, Japanese Patent Application Laid-open No. Hei 09-154087 (Patent Reference 1). In an ordinary liquid crystal display device, a Y driver (gate driving section) is mounted, as an independent IC module, on a board and, as shown in FIG. 10B, if timing when a scan disable signal (gate mask signal) GINH is supplied to the Y driver is not proper, that is, if a delay occurs in the GINH signal, an unwanted pulse appears in a scanning signal Y1, causing the occurrence of an unwanted stripe on a display screen in some cases. Therefore, in the display control device disclosed in the above Reference 1, when video signals exceeding an image display area (number of scanning lines) are inputted, as shown in FIG. 10A, horizontal video signals are properly thinned out without causing a malfunction by masking a gate output at an appropriate position and by partially disabling writing to pixels of the liquid crystal panel. By configuring above, it is assumed that a state of no occurrence of noises for 2H periods in one frame is produced in one position or more, which causes noises caused by a change in currents not to occur.

However, the technology disclosed in the above Reference 1 has the following problems. That is, in the display control device disclosed in the Reference 1, video signals are thinned out and complemented and, therefore, video signals are partially deleted (thinned out). That is, this causes loss of video signals and, when all inputted video signals are to be displayed, another problem arises that the originally desired video display is not performed satisfactorily.

SUMMARY OF THE INVENTION

In view of the above, it is an object of the present invention to provide a liquid crystal display device, and a timing controller and signal processing method to be used in the same being free from degradation of signal receiving sensitivity and/or malfunction without performing thinning-out and complementing on video signals of an electronic device to receive and transmit data.

According to a first aspect of the present invention, there is provided a liquid crystal display device including a liquid crystal panel having predetermined columns of data electrodes, predetermined rows of scanning electrodes, pixels each being mounted at an intersection of each of the data electrodes and each of the scanning electrodes, common data electrodes each operating as a facing electrode of each of the pixels, a data driving section to write corresponding pixel data to each of said data electrodes based on a video signal strobe signal provided for every one horizontal period and to drive said liquid crystal panel with AC (Alternating Current) current in a predetermined manner based on a polarity inversion control signal provided for every one horizontal period, a gate driving section to output a scanning signal that synchronizes to a vertical synchronizing signal provided for every one vertical period and to drive each of the scanning electrodes in a predetermined order based on a vertical drive clock signal provided for every one horizontal period, and a control unit to output the video signal strobe signal and the polarity inversion control signal to the data driving section based on a video signal and to output the vertical synchronizing signal and the vertical drive clock signal to the gate driving section, wherein the control unit provides a horizontal synchronizing signal stop period setting mode which sets a stop period in which outputting of a horizontal synchronizing signal including the video signal strobe signal and the vertical drive clock signal is stopped at least one time and for (1+X) horizontal periods or more (X being a real number which is greater than zero) during a display period in said one vertical period.

According to a second aspect of the present invention, there is a timing controller to be used in a liquid crystal display device including a liquid crystal panel having predetermined columns of data electrodes, predetermined rows of scanning electrodes, pixels each mounted at an intersection of each of the data electrodes and each of the scanning electrodes, and common electrodes each operating as a facing electrode, of a data driving section to write pixel data to each of the data electrodes based on a video signal strobe signal provided for every one horizontal period and to drive said liquid crystal panel with AC (Alternating Current) current in a predetermined manner based on a polarity inversion control signal provided for every one horizontal period, and of a gate driving section to output a scanning signal that synchronizes to a vertical synchronizing signal provided for every one vertical period and drives each of the scanning electrodes in a predetermined order in accordance with a vertical drive clock signal provided for every one horizontal period, wherein the video signal strobe signal and polarity inversion control signal are outputted to the data driving section based on a video signal and the vertical synchronizing signal and vertical drive clock signal are outputted to the gate driving section and a horizontal synchronizing signal stop period setting mode is provided to set a stop period during which outputting of a vertical synchronizing signal including the video signal strobe signal and vertical drive clock signal is stopped at least one time and for (1+X) horizontal periods or more (X being a real number which is greater than zero) in a display period within the one vertical period.

According to a third aspect of the present invention, there is provided a signal processing method to be used in a liquid crystal display device including a liquid crystal panel having predetermined columns of data electrodes, predetermined rows of scanning electrodes, pixels each mounted at an intersection of each of the data electrodes and each of the scanning electrodes, and common electrodes each operating as a facing electrode, of a data driving section to write pixel data to each of the data electrodes based on a video signal strobe signal provided in every one horizontal period and to drive said liquid crystal panel with AC (Alternating Current) current in a predetermined manner based on a polarity inversion control signal provided for every one horizontal period, of a gate driving section to output a scanning signal that synchronizes to a vertical synchronizing signal provided for every one vertical period and drives each of the scanning electrodes in a predetermined order in accordance with a vertical drive clock signal provided for every one horizontal period, and of a control unit to output, to the data driving section, the video signal strobe signal and polarity inversion control signal and to output, to the gate driving section, the vertical synchronizing signal and vertical drive clock signal, the signal processing method including a horizontal synchronizing signal stop period setting mode processing in which a stop period is set during which the control unit stops outputting of a horizontal synchronizing signal including the video signal strobe signal and vertical drive clock signal at least one time and for (1+X) horizontal periods or more (X being a real number which is greater than zero) during a display period in the one vertical period.

With the above configurations, it is made possible to secure a period where no noises caused by writing on the liquid panel occur for (1+X) horizontal periods or more in at least one given places in one vertical period.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Figure 1:
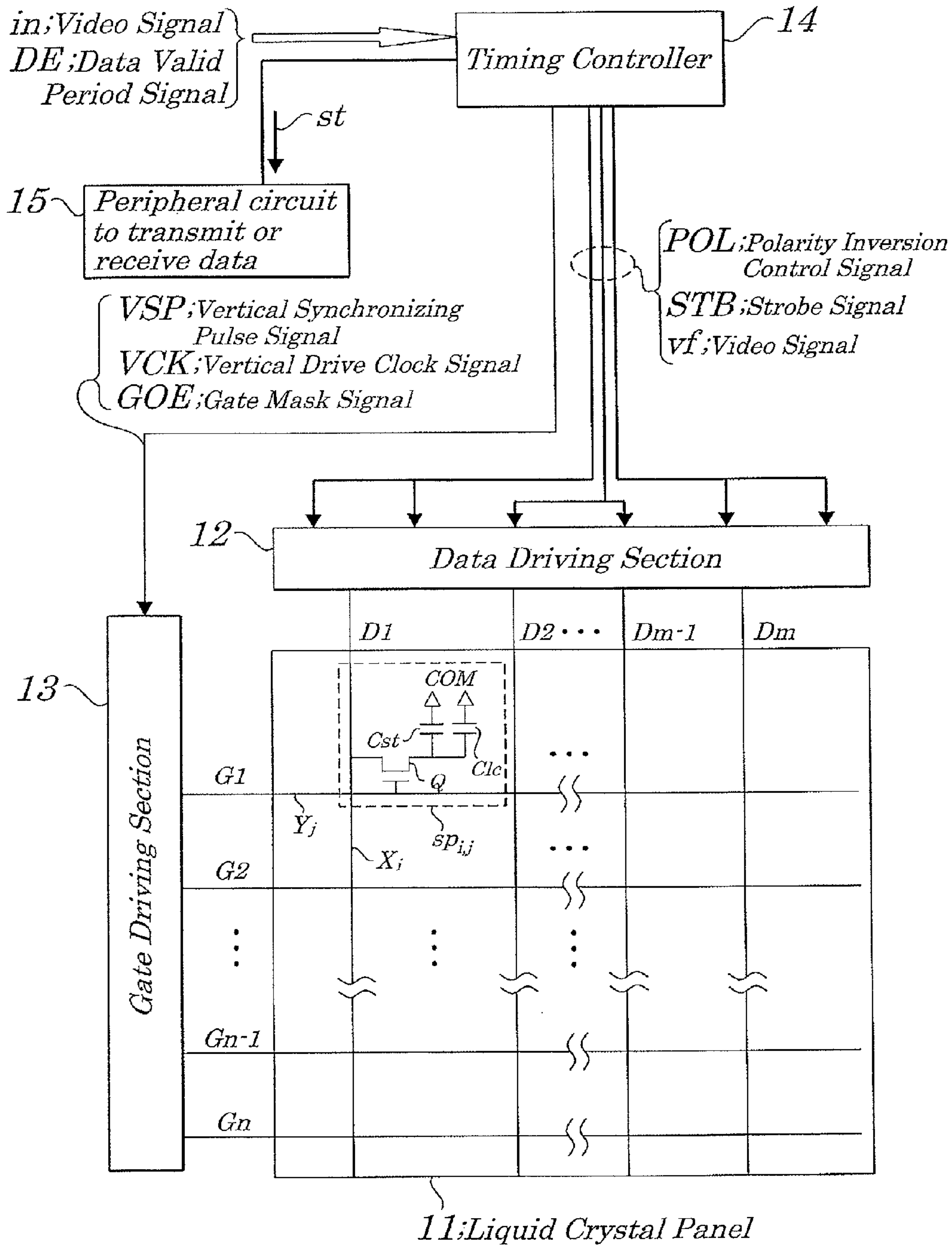
FIG. 1 is a diagram showing electrical configurations of main components of a liquid crystal display device according to a first exemplary embodiment of the present invention.

Best modes of carrying out the present invention will be described in further detail using various exemplary embodiments with reference to the accompanying drawings.

In exemplary embodiments of the present invention, there is provided a liquid crystal display device so configured that the control unit provides the horizontal synchronizing signal stop period setting mode which sets the stop period in which outputting of the horizontal synchronizing signal is stopped at least one time and for two horizontal periods or more during a display period in the one vertical period.

With the provided liquid crystal display device, it is made possible to secure a period where no noises caused by writing on the liquid panel occur for (1+X) horizontal periods or more in at least one given places in one vertical period. By configuring like this, when a circuit for receiving and transmitting data being easily influenced by noises is mounted in an area surrounding the liquid crystal panel, by performing transmission and receipt of data, the occurrence of degradation of signal receiving sensitivity and/or malfunction can be avoided. In the case of a liquid crystal panel having large resolution in particular, since cycles of receiving and transmitting data become slow in the one horizontal period compared with the period for data transmission and receipt of data, setting of a period during which no noises occur is effective.

The provided control device may be so configured to, in a horizontal synchronizing signal stop period setting mode, output a gate mask signal to stop outputting of a scanning signal for a period being shorter than a stop period of a horizontal synchronizing signal, to a gate driving section.

Moreover, in the horizontal synchronizing signal stop period setting mode, the control device is so configured to sustain a logic level of a polarity inversion control signal during part or all of the stop period of the horizontal synchronizing signal. In the interior of or in an area surrounding the liquid crystal display device, an electronic device to perform a predetermined operation based on a first signal is located and the above control device has a signal transmitting section which, in the horizontal synchronizing signal stop period setting mode, transmits the first signal indicating that outputting of the horizontal synchronizing signal is in a stop state to the above electronic circuit. Also, in the interior of or in an area surrounding the liquid crystal display device, an electronic circuit to output a second signal indicating that the electronic circuit is in a ready state of performing an operation at a time when a predetermined operation is to be performed and the control device has a signal judging section which, when the second signal is outputted from the electronic circuit, starts operations corresponding to the horizontal synchronizing signal stop period setting mode.

Here, a method for producing a signal which causes the occurrence interval of noises to be, for example, 2H will be explained.

A horizontal synchronizing signal and vertical synchronizing signal to drive a liquid crystal display device are standardized according to VESA (Video Electronics Standards Association) Specifications and occurrence timing of the horizontal synchronizing signal and vertical synchronizing signal is determined based on the VESA Specifications. For example, for the liquid crystal having UXGA (Ultra Extended Graphics Array) resolution, the following specifications have been determined:

Resolution; 1600×1200 (dots)
Pixel Clock; 130.25 (MHz)
Horizontal Frequency; 74.00 (kHz)
Vertical Scan Frame Rate; 59.92 (Hz)
Horizontal Total; 1760 (Pixels)
Horizontal Black; 160 (Pixels)
Vertical Total; 1235 (Lines)
Vertical Blank; 35 (Lines)

In the case of driving the ordinary liquid crystal panel with UXGA resolution, according to the above Specifications, Pixels Clock (hereinafter PCLK) is 130.25 MHz, CLK (hereinafter VCLK) being equivalent to Horizontal Frequency used to drive a gate driving section is 74.00 kHz and the liquid crystal panel is driven at a frame rate of 59.92 Hz (about 60 Hz).

As is apparent from the above Specifications, in order to drive the liquid crystal panel at 60 Hz, the following settings are required:

$$\text{PCLK}\times(1/\text{Horizontal Total})\times(1/\text{Vertical Total})=59.92\ \text{Hz}$$

therefore,

PCLK=130.25 (MHz)
Horizontal Total=1760 (Pixels)
Vertical Total=1235 (Lines).

Here, since a video display region of the UXGA is 1600×1200 (dots), the following blank period (video signal non-display period) exists.

Horizontal Blank=160 (Pixels)

Vertical Blank=35 (Lines).

By deleting the blank period being equivalent to a 1H period and inserting the 1H period into a given period within the display period, writing to a pixel of the liquid crystal panel is stopped for the 1H period and, as a result, a period corresponding to the 2H period not generating noises is produced.

In this case, no noise occurs for the 1H period by normal driving and, by inserting a blank being equivalent to a 1H period, 2H periods during which no noise occurs are generated. Moreover, the stopping of writing for the above 1H period is merely one example and the writing may be stopped, for example, for 2H or 1.5H periods. That is, by stopping the writing for (X+1) H periods (X is a real number being greater than zero), a period during which writing to pixels of the liquid crystal panel is not performed is ensured for (X+1) H periods and a period during which noises caused by the writing to the pixels do not occur is ensured for the (X+1) H periods. By operating a circuit for receipt and transmittance of data for the (X+1) H period, data can be received and transmitted without influences by noises caused by the writing to the liquid crystal display panel. In this case, a value for X is set to a value being not less than a value for the shortest period required for receipt and transmittance of data.

In addition to the above, control not to delete the video signal is required at the same time. Thus, by setting a period in which noises are allowed to occur partially during the 1H period or more to stop writing to the pixel of the liquid crystal panel during (1+X) H periods and by letting the data transmitting/receiving circuit operate in an intensive and targeted manner during the (1+X) H periods, as the data receiving and transmitting period, the (1+X) H periods can be secured and, even if the 1H period is not enough to receive and transmit data, data can be intermittently received and transmitted a plurality of times during one frame period without being affected by noises caused by writing on the liquid crystal panel.

Though it can be thought that the transmission and receipt of data of the peripheral circuit is performed during the non-display period of the video signal, if the data of the peripheral circuit is attempted to be received and transmitted by using the Horizontal Blank period, only 1/10 period, as the data receiving and transmitting period, can be secured, which causes the data transmission and receipt time to become insufficient. Moreover, if the data of the peripheral circuit is attempted to be received and transmitted by using the Vertical Blank period, 35H periods, as the data receiving and transmitting period, can be secured, however, the cycle for the data transmission and receipt is restrained by the Vertical Scan Rate (59.92 Hz) designated by the Specifications and, as a result, a problem arises that cycles for receiving and transmitting data of the peripheral circuit become slow. If the cycle for transmission and receipt becomes slow, another problem arises that, a pointer on a display screen is attempted to be moved by tracing using a pointer recognizing device, followability is lowered.

The present invention is featured in that not only a period for the transmission and receipt of data of the peripheral circuit but also the cycle for receiving and transmitting data of the peripheral circuit can be secured.

First Exemplary Embodiment

FIG. 1 is a diagram showing electrical configurations of main components of a liquid crystal display device of a first exemplary embodiment of the present invention. The liquid crystal display device of this type, as shown in FIG. 1, includes a liquid crystal panel 11, a data driving section 12, a gate driving section 13, and a timing controller 14. In a location near to the liquid crystal panel 11, a peripheral circuit 15 to receive and transmit data is placed. The liquid crystal panel 11 is made up of data electrodes Xi (i=1, 2, . . . , m, for example, m=1600), scanning electrodes Yj (j=1, 2, . . . , n, for example, n=1200), pixels Spi,j, and common electrodes COM.

To each of the data electrodes Xi is applied a voltage corresponding to pixel data Di. To each of the scanning electrodes Yj is supplied a scanning signal Gj in a predetermined order. Each of the pixels SPi,j is mounted at the intersection of each of the data electrodes Xi and each of scanning electrodes Yj and is made up of a TFT transistor Q, a holding capacitor Cst, a liquid crystal layer C1*c*, and each of the common electrodes COM. The holding capacitor Cst holds a voltage corresponding to applied pixel data Di. The liquid crystal layer C1*c* shows diagrammatically a liquid crystal layer to display a pixel of a gray level corresponding to the pixel data Di. To each of the common electrodes COM is applied a common voltage. The data driving section 12 writes pixel data Di corresponding to an video signal "vf" to each of data electrodes Xi based on a video signal strobe signal STB provided for every one horizontal (1H) period and drives the liquid crystal panel 11 with AC current in a predetermined manner based on a polarity inversion control signal POL provided for every one horizontal (1H) period. In this case, the data driving section 12 alternately inverts the phase of the common voltage to be applied to the common electrode COM for every one dot and for every frame (between an odd-numbered frame and an even-numbered frame), for example, in a manner to correspond to the dot inversion driving method, or alternately inverts the phase of the voltage to be applied to the data electrode Xi for every one dot and for every frame (between the odd-numbered frame and the even-numbered frame). The gate driving section 13 outputs a scanning signal Gj that synchronizes to a vertical synchronizing pulse signal VSP provided for every one vertical (1V) period and drives each scanning electrode Yj in a predetermined order based on a vertical drive clock signal VCK provided for every one horizontal (1H) period.

The timing controller 14 receives a video signal "in" and a data valid period signal DE (DE signal), performs the sorting of signals and setting of a transmission voltage amplitude, and outputs the video signal strobe signal STB (STB signal), the polarity inversion control signal POL (POL signal) to the data driving section 12 and the vertical synchronizing pulse signal VSP (VSP signal), the vertical drive clock signal VCK (VCK signal), and a gate mask signal GOE (GOE signal) to the gate driving section 13. Particularly, according to the exemplary embodiment, the timing controller 14 provides a horizontal synchronizing signal stop period setting mode to set a stop period during which the outputting of horizontal synchronizing signals made up of the video signal strobe signal STB and vertical drive clock signal VCK is stopped at least one time and for at least two horizontal periods during a display period within a 1V period.

The timing controller 14, while operating in the horizontal synchronizing signal stop period setting mode, outputs the gate mask signal GOE to stop the outputting of the scanning signal Gj for a period being shorter than the stop period of the above horizontal synchronizing signal, to the gate driving section 13. The timing controller 14, while operating in the horizontal synchronizing signal stop period setting mode, sustains a logic level of the polarity inversion control signal POL during part or all of the periods while the above horizontal synchronizing signal is stopped. The timing controller 14, while operating in the horizontal synchronizing signal stop period setting mode, transmits a status signal "st" (first signal) indicating the state in which the outputting of the horizontal synchronizing signal is stopped, to the peripheral circuit 15. The peripheral circuit 15 receives and transmits data in accordance with the status signal "st" transferred from the timing controller 14.

Figure 2:
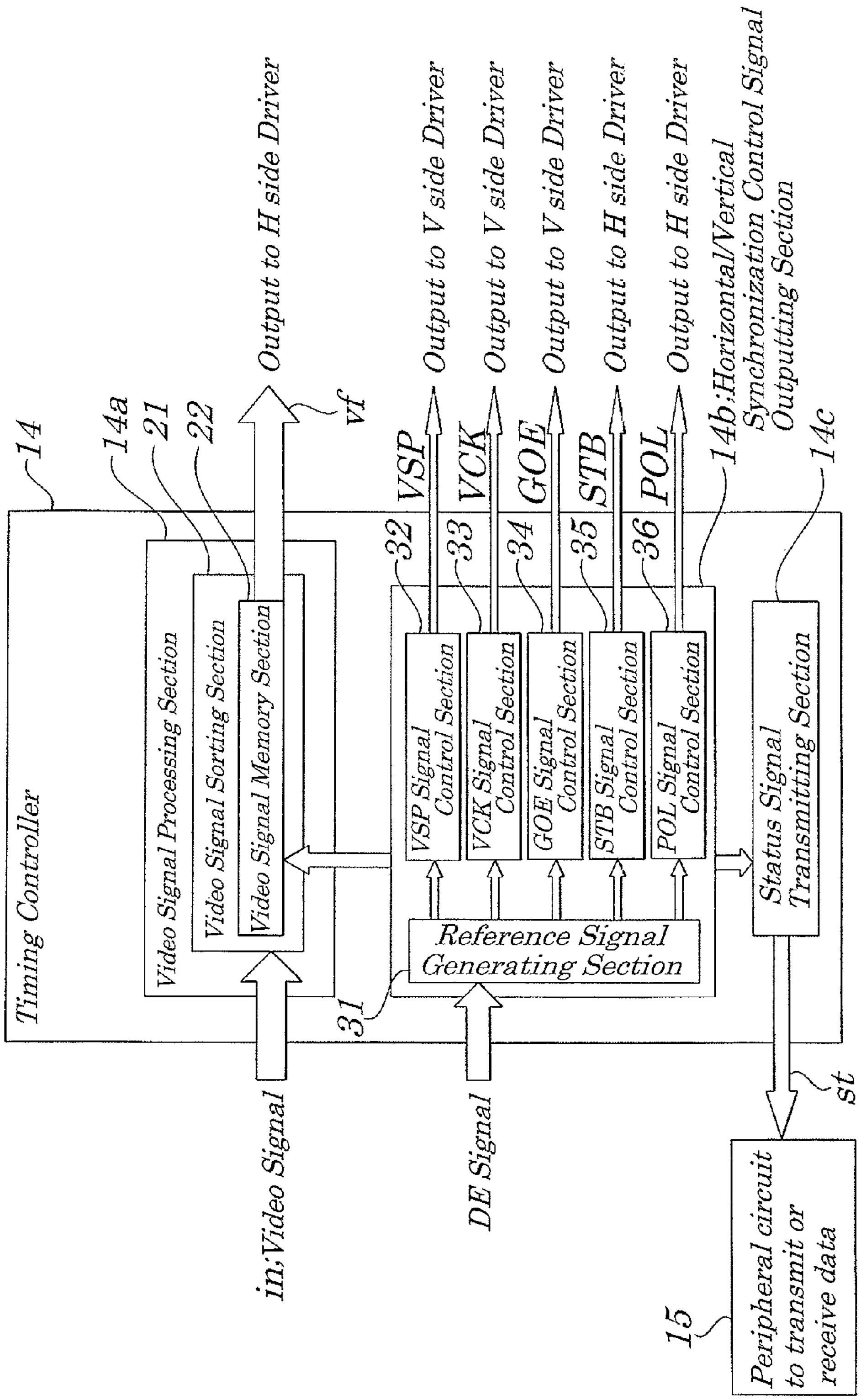
FIG. 2 is a block diagram showing configurations of a timing controller in FIG. 1.

FIG. 2 is a block diagram showing configurations of the timing controller 14 in FIG. 1. The timing controller 14, as shown in FIG. 2, has a video signal processing section **14*a*, a horizontal/vertical synchronization control signal outputting section 14*b*, and a status signal transmitting section 14*c*. The video signal processing section 14*a* has a video signal sorting section 21 provided with a video signal memory section 22. The video signal sorting section 21 sorts the video signal "in" and the video signal memory section 22 stores the sorted signals. The horizontal/vertical synchronization control signal outputting section 14*b* is made up of a reference signal generating section 31, a VSP signal control section 32, a VCK signal control section 33, a GOE signal control section 34, an STB signal control section 35, and a POL signal control section 36. According to control of the reference signal generating section 31, the VSP signal control section 32 produces and controls the VSP signal, the VCK signal control section 33 produces and controls the VCK signal, the GOE signal control section 34 produces and controls the GOE signal, the STB signal control section produces and controls the STB signal and the POL signal control section 36 produces and controls the POL signal. The status signal transmitting section 14*c* transmits a status signal "st" to the peripheral circuit 15** in accordance with the horizontal synchronizing signal stop period setting mode.

Figure 3:
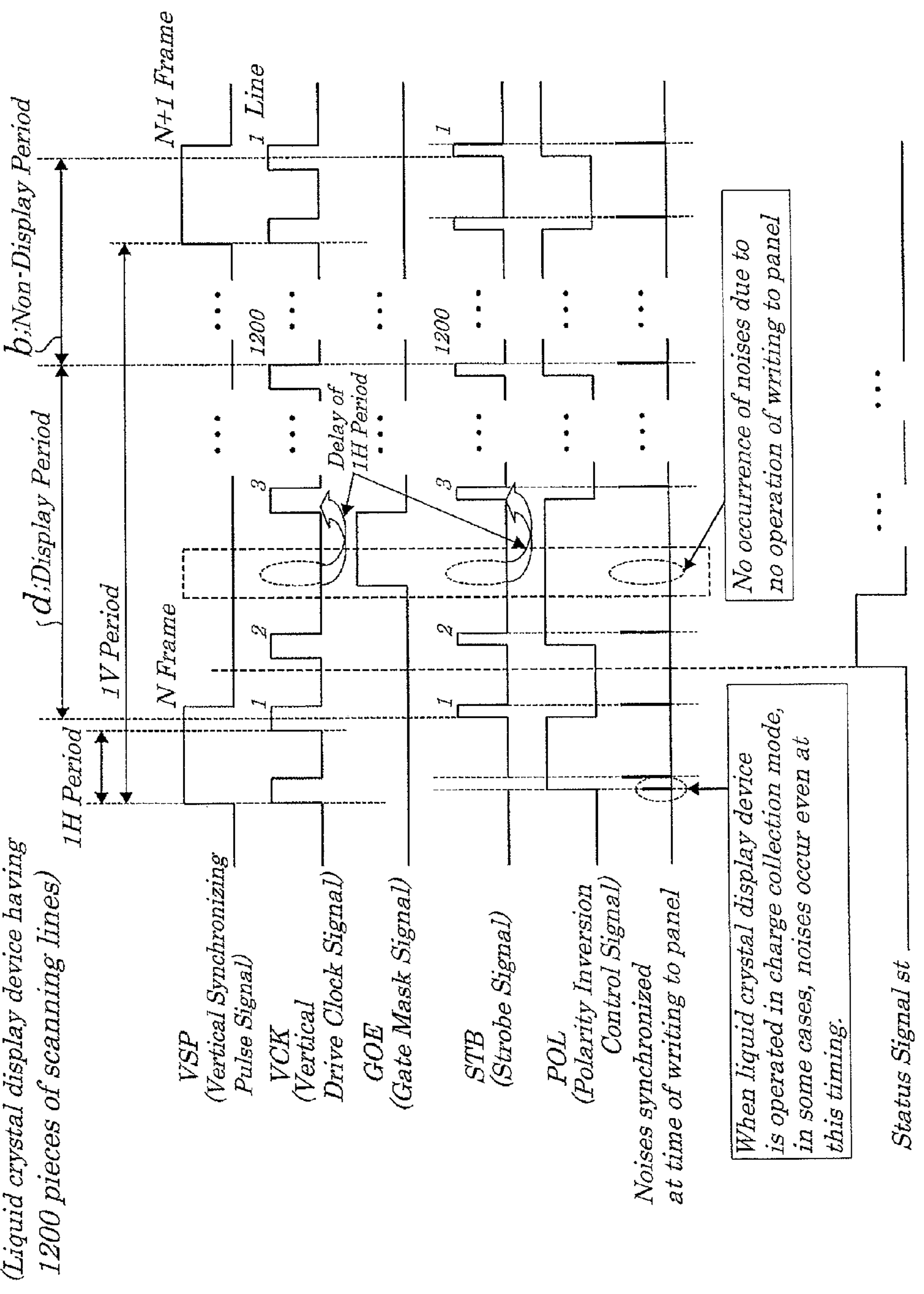
FIG. 3 is a timing chart explaining operations of the timing controller according to the first exemplary embodiment of the present invention.
Figure 4:
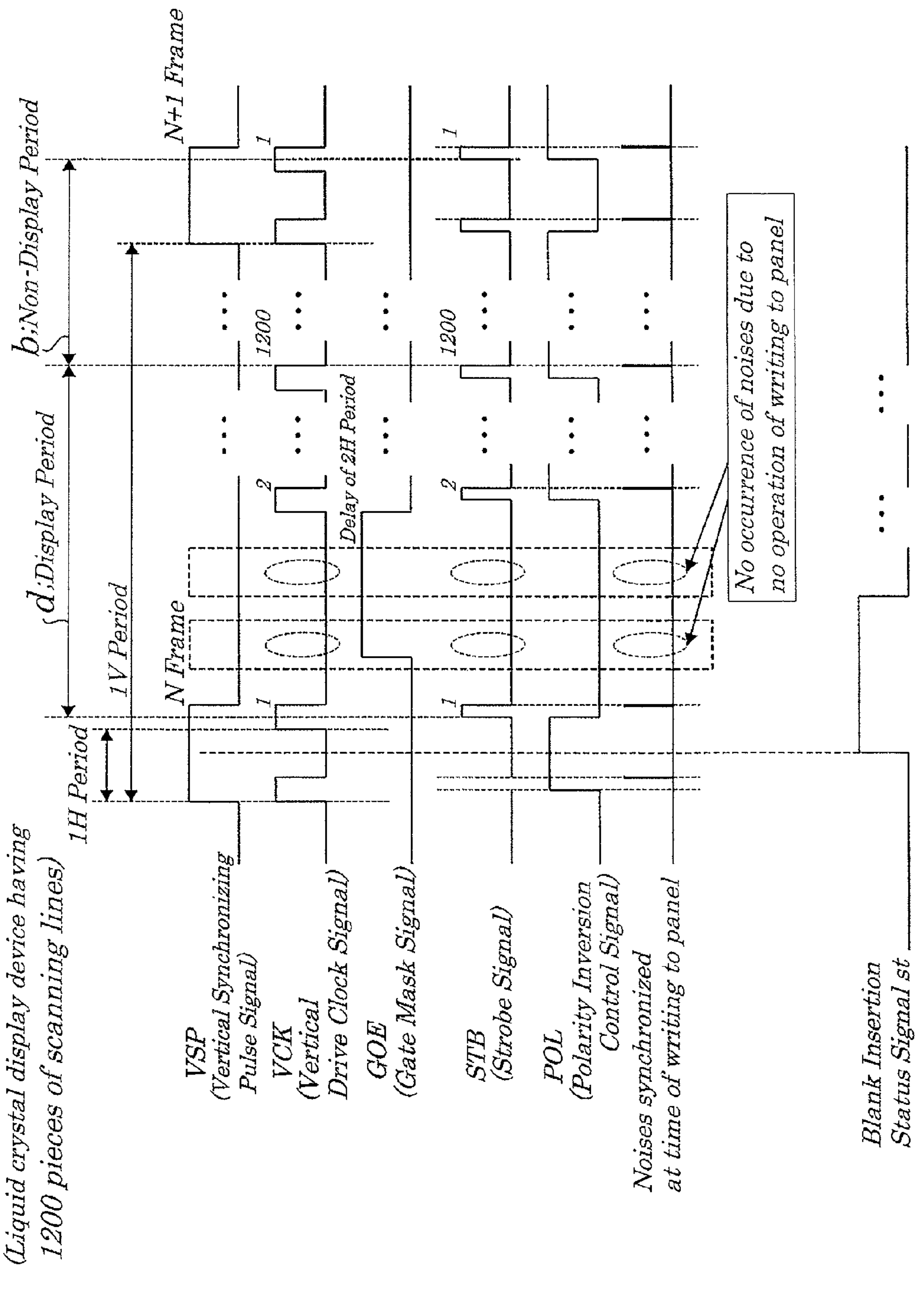
FIG. 4 is also a timing chart explaining another operation of the timing controller according to The first exemplary embodiment of the present invention.
Figure 5:
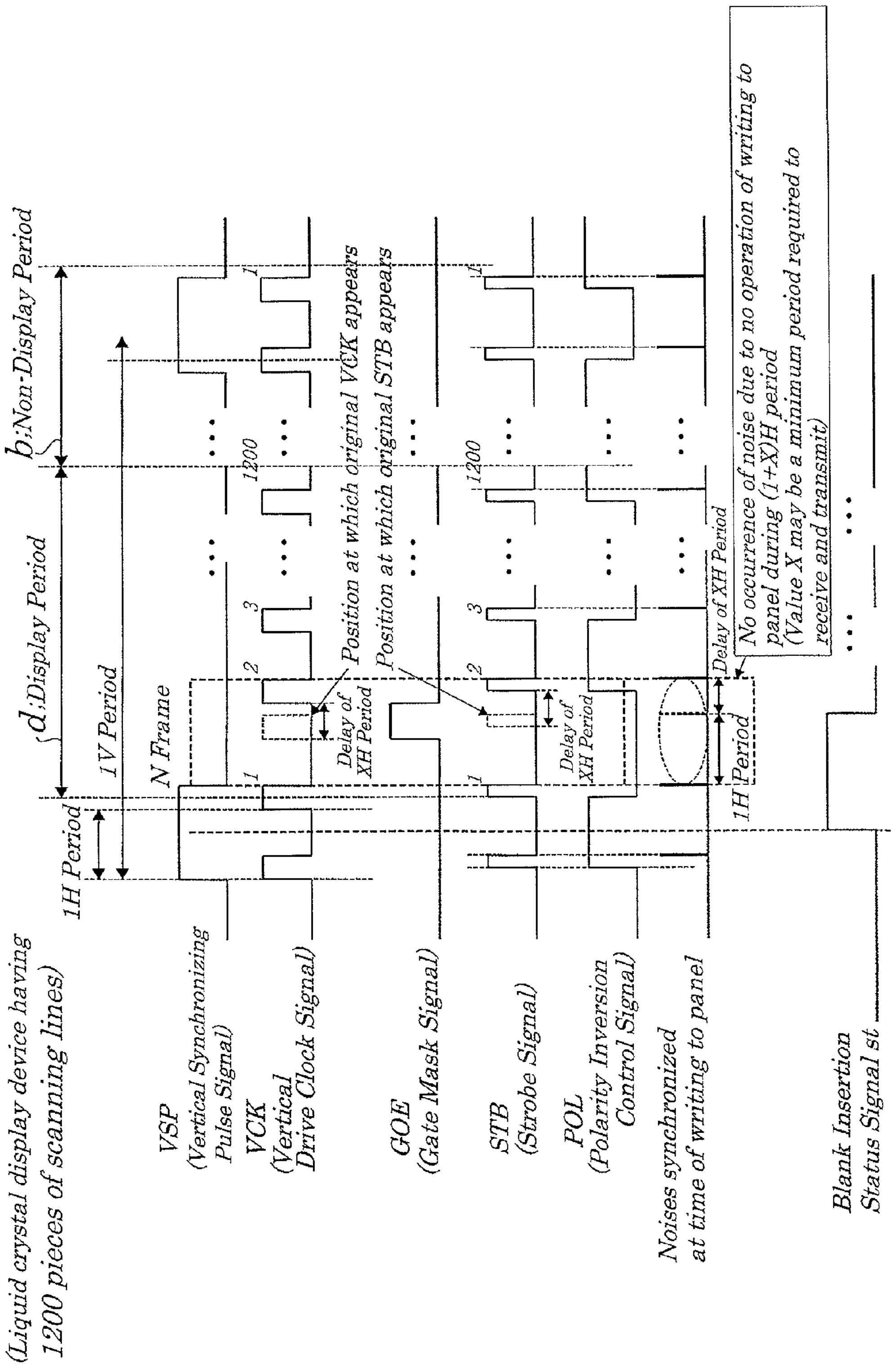
FIG. 5 is also a timing chart explaining still another operation of the timing controller according to the first exemplary embodiment of the present invention.

FIG. 3 is a timing chart explaining operations of the timing controller 14 and FIGS. 4 and 5 are timing charts explaining other operations of the timing controller 14. By referring to these drawings, a signal processing method to be used in the liquid crystal display device of this type is described.

According to the liquid crystal display device of the first exemplary embodiment, its timing controller 14 sets a stop period during which outputting of a horizontal synchronizing signal made up of the video signal strobe signal STB and vertical drive clock signal VCK is stopped at least one time and for at least two horizontal periods during the display period within a 1V period (horizontal synchronizing signal stop period setting mode processing). In the horizontal synchronizing signal stop period setting mode processing, the gate mask signal GOE to stop the outputting of the scanning signal Gj for a period being shorter than the stop period of the above horizontal synchronizing signal is outputted by the timing controller 14 to the gate driving section 13. Also, in the horizontal synchronizing signal stop period setting mode processing, a logic level of the polarity inversion control signal POL is sustained by the timing controller 14 for part or all of the stop period of the above horizontal synchronizing signal. Further, in the horizontal synchronizing signal stop period setting mode processing, the status signal "st" indicating the state where the outputting of the above horizontal synchronizing signal is stopped is transmitted by the timing controller 14 to the peripheral circuit 15 (signal transmission processing).

That is, at the N-th line (N is an integer greater than 1) during the display period d, the outputting of the horizontal synchronizing signals (VCK and STB signals) is stopped and blanks are inserted for the 1H period in the N-th line. In this case, as shown in FIG. 3, the outputting of the horizontal synchronizing signals for the 1H period is stopped at the 3-rd line. Since the blank is inserted for the 1H period, the writing to the pixel SPi,j is stopped for the 1H period. Owing to this, no change in currents occurring at the time of writing occurs and, further, no noises occurring in synchronization with the current change occurs. Here, if the cycle in the 1H period is unchanged when the writing to the pixel SPi,j is stopped for the 1H period, the blank period (non-display period) is shortened by stop time of the 1H period. The process of delaying the outputting of the horizontal synchronizing signals (VCK and STB signals) at the N-th line for the 1H period is called a process of "inserting the 1H blank at N-th line".

Next, control on the GOE and POL signals when the 1H blank is inserted at the N-th line is described. In the gate driving section 13, ordinarily, the shift registers are operated and, therefore, unless outputting of the GOE signal is controlled, the insertion of blanks for the 1H period causes the gate to be ON for the 2H periods and excessive writing to the pixel Pi, j is done. In order to avoid the excessive writing, the period while the gate is ON should be the same 1H period as in other lines and, therefore, during the period where the 1H blank is being inserted, the masking of the gate is required. Moreover, it is necessary that the POL signal is controlled so that the polarity of pixels of lines ahead and behind the position where the 1H blank period is inserted is the same as in the case where no 1H period is inserted. FIG. 3 shows the state where the dot insertion driving is operated and the polarity of the pixel of the lines ahead and behind the position where the 1H blank period is inserted is the same as in the case of the dot inversion driving. The GOE signal to be outputted in the case where the 1H blank is inserted at the N-th line becomes valid (High) when rising after the lapse of the 1H period from the position of the rising of the VCK signal at the N−1st line and becomes invalid (Low) when falling after the lapse of the 1H period from the rising. The POL signal is inverted in polarity by the rising of the STB signal at the N-th line and is held for 2H periods and is again inverted in polarity after the lapse of the 2 periods. Moreover, if the problem of variation of G-D delay (transmission delay between a gate and a drain) of each of TFTs mounted in the liquid crystal panel 11 arises, control is exerted so that the polarity inversion control signal POL is inverted in polarity after the lapse of the 1H period and is held at the time of next rising of the STB signal.

In the above operations, by the insertion of the blank, the inputted video signal "vf" is deleted and, therefore, it is necessary to hold the video signal "vf" outputted at the N-th line until the STB signal rises next after the completion of the blank insertion. In the example shown in FIG. 3, at the 3rd line, the blank is inserted for the 1H period and, therefore, the holding of the video signal "vf" at the 3rd line for the 1H period is necessary. The process of holding the video signal "vf" is performed in a memory region for one line in the video signal memory section 32 of the timing controller 14. This enables a blank to be inserted without deleting the video signal "vf". It is, however, necessary to provide the information about when the blank is inserted during the display period d to the peripheral circuit 15 and, therefore, the status signal "st" is transmitted to the peripheral circuit 15 at the same timing as the start of the blank insertion. If the 2H periods are not a sufficient time for the peripheral circuit 15 to receive and transmit data, then 3H periods are required, for example, 2H blank periods are inserted as shown in FIG. 4.

In the above description, one example is shown in which the period required for transmission and receipt of data is 2H or 3H periods and, substantially, when the 1H period is not enough for transmission and receipt of data, the basic matter is what periods are required for the transmission and receipt of the data and, therefore, the writing to the liquid crystal panel 11 may be stopped simply depending on the periods required for the transmission and receipt of the data. Here, the period during which the writing to the liquid crystal panel 11 has the same meaning as the delayed time by an XH period from its original 1H period occurred when a writing control signal to the liquid crystal panel 11 is received and, therefore, the period required for transmission and receipt of data is represented as the (1+X) H period (X is a real number being greater than zero). For example, the case where X=1 is shown in FIG. 3 and the case where X=2 is shown in FIG. 4. Moreover, as shown in FIG. 5, it is not necessary that the period required for transmission and receipt of data is an integral multiple of the 1H period and, for example, if 1.5H periods is required, it is not necessary to prepare 2H periods and, by selecting the case where X=0.5, that is, by minimizing the amount of delay, data can be received and transmitted without influences by noises caused the writing to the liquid crystal panel 11.

Thus, according to the first exemplary embodiment, the stop period is set by the timing controller 14, during which outputting of horizontal synchronizing signals made up of the video signal strobe signal STB and vertical drive clock signal VCK is stopped at least one time and for (1+X) H periods or more during the display period within the 1V period and, as a result, it is made possible to produce a region where no noises occur for (1+X) H periods or more. Moreover, since the gate mask signal GOE to stop the outputting of the scanning signal Gj for a period being shorter than the period of stopping the above horizontal synchronizing signals is outputted by the timing controller 14 to the gate driving section 13 and since a logic level of the polarity inversion control signal POL is sustained during part or all of the stop period of the above horizontal synchronizing signal, the blank insertion is made possible without deleting the inputted video signal "vf". By starting the transmission and receipt of data in the peripheral circuit 15 using the status signal "st" transmitted in synchronization with the blank insertion as a reference, data can be received and transmitted smoothly without the degradation in signal receiving sensitivity and/or malfunction due to noises caused by writing on the liquid crystal panel 11. Particularly, this technology is effective in the case where a 1H period or more is required as a period for data transmission and receipt in the peripheral circuit 15. Furthermore, this technology is effective in the liquid crystal display device operating at high resolution and in short 1H period.

Moreover, the region of the (1+X) H period can be obtained by setting the XH period as delayed time and by ensuring the minimum region required for the transmission and receipt of data, the amount of delay can be minimized. The minimized amount of delay enables the increase in the number of times of insertion of the blank period for 1V period of time, which can speed up the period for transmission and receipt of data. When the period for the transmission and receipt of data is speeded up, if the pointer on the display screen is moved by following operations of the pointer recognizing device, followability is improved.

Second Exemplary Embodiment

Figure 6:
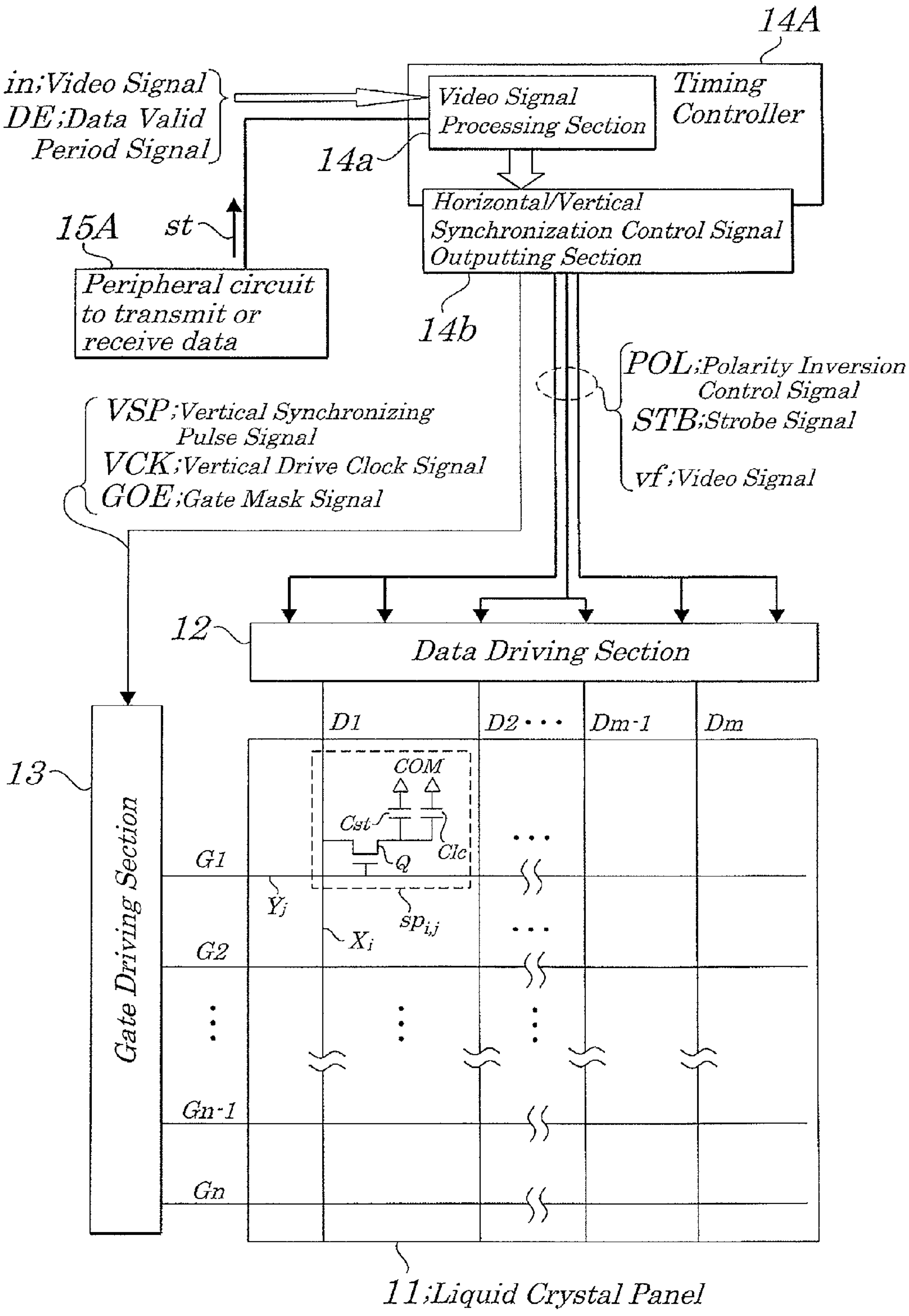
FIG. 6 is a diagram showing electrical configurations of main components of a liquid crystal display device according to a second exemplary embodiment of the present invention.

FIG. 6 is a diagram showing electrical configurations of main components of a liquid crystal display device according to a second exemplary embodiment of the present invention. In FIG. 6, the same reference numbers as used in the first exemplary embodiment are assigned to components having the same function as for the first exemplary embodiment, as shown in FIG. 1. The liquid crystal display device of the second exemplary embodiment, as shown in FIG. 6, includes a timing controller 14A having functions different from those of the timing controller 14 in FIG. 1. In a location near to the liquid crystal panel 11, a peripheral circuit 15A having functions different from those of the peripheral circuit 15 in FIG. 1 is mounted. The peripheral circuit 15A, when performing transmission and receipt of data, outputs a status signal "st" (second signal) indicating the state where the operation can be performed. The timing controller 14A, when the status signal "st" is outputted from the peripheral circuit 15A, performs operations in a manner to respond to a horizontal synchronizing signal stop period setting mode. Configurations other than above are the same as in FIG. 1.

Figure 7:
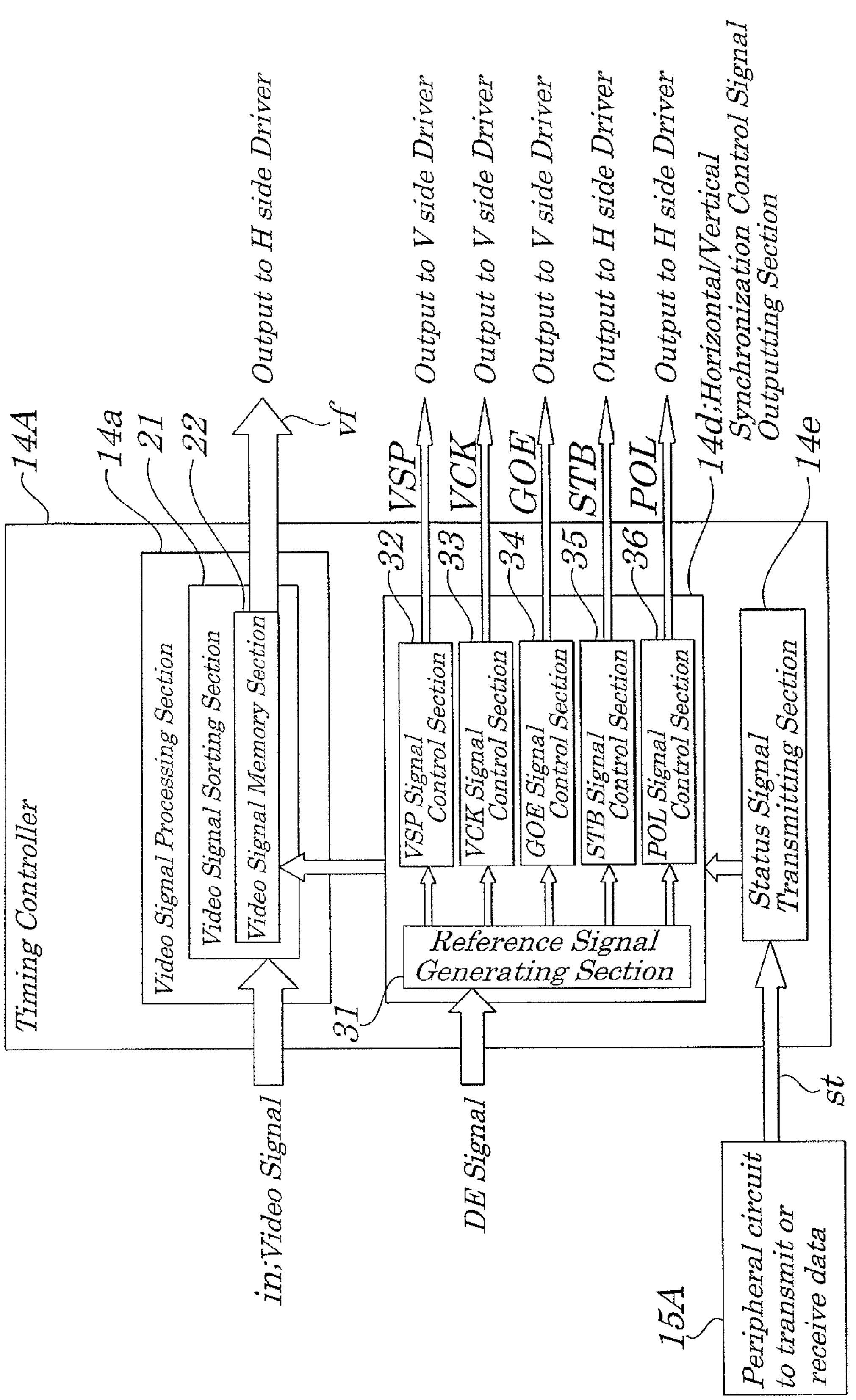
FIG. 7 is a block diagram showing configurations of a timing controller in FIG. 6.
Figure 8:
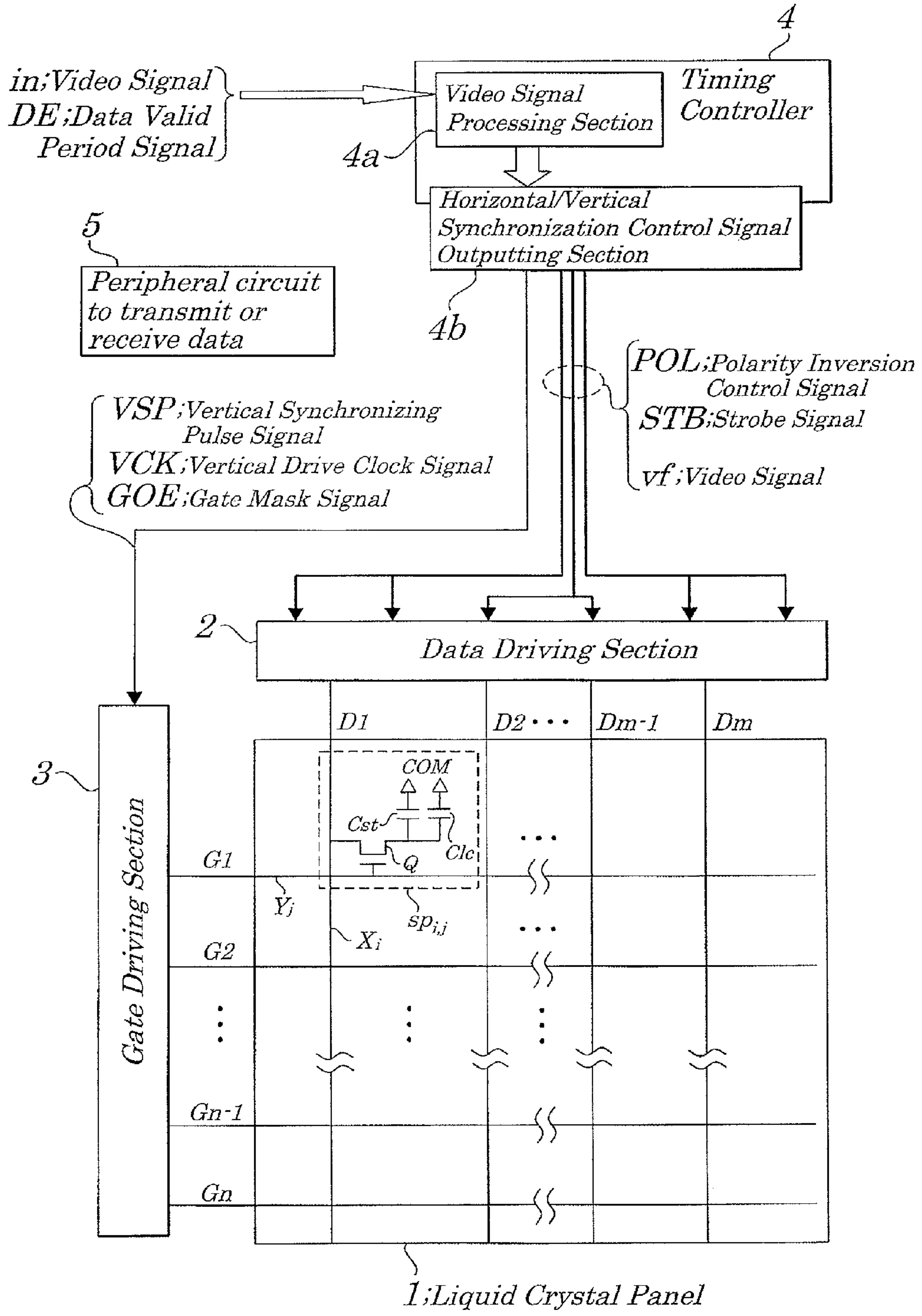
FIG.8 (RELATED ART)
FIG. 8 is a diagram showing configurations of a liquid crystal display device as a first related art.
Figure 9:
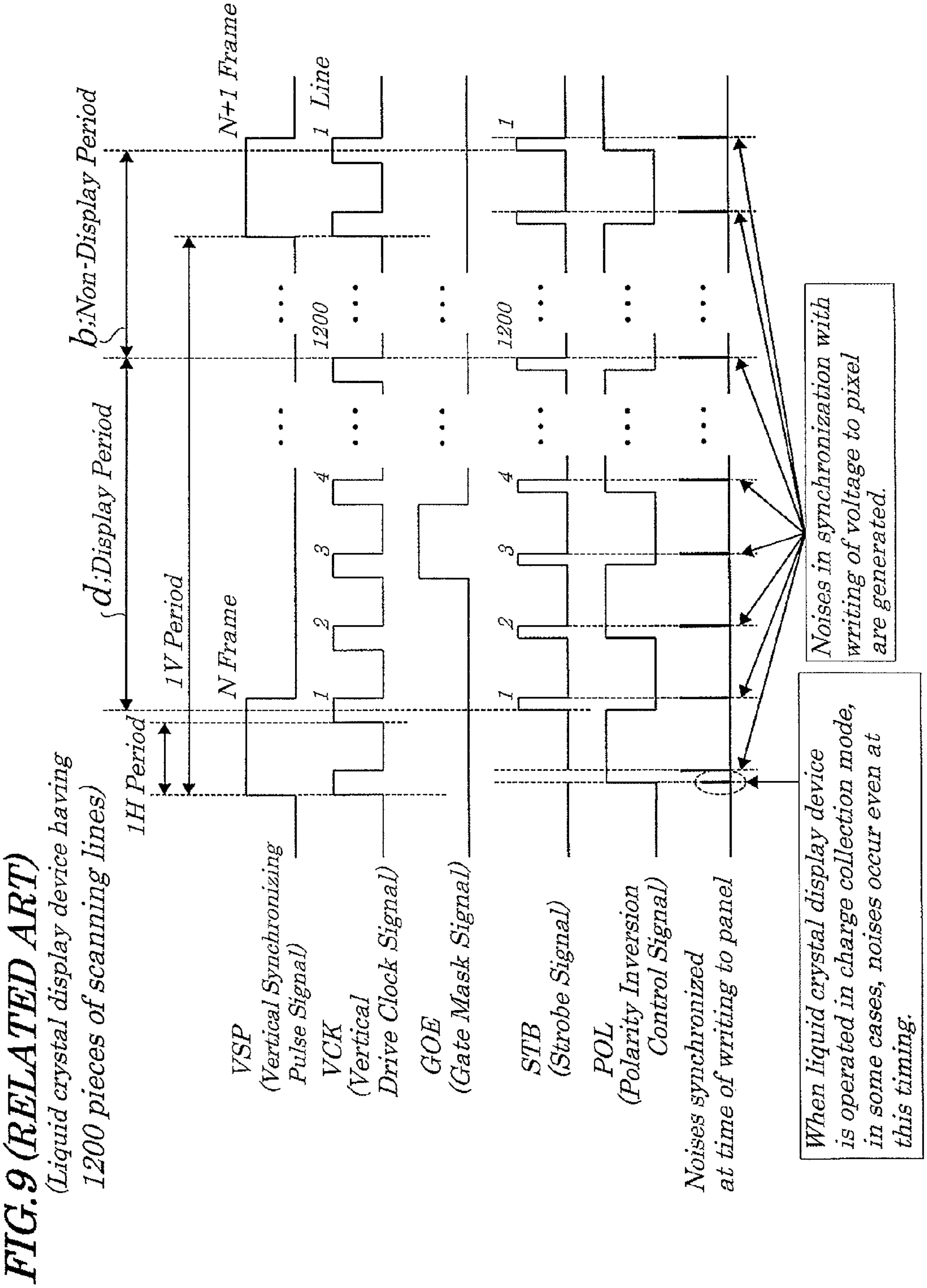
FIG.9 (RELATED ART)
FIG. 9 is a diagram explaining each signal shown in FIG. 8.
Figure 10A:
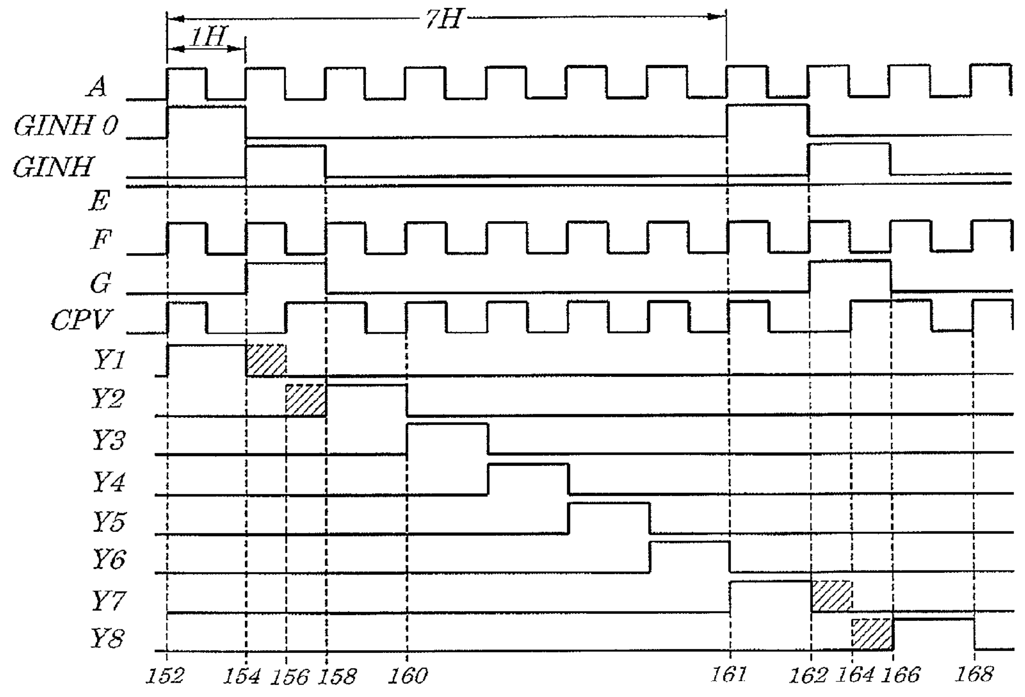
FIG. 10A (RELATED ART)
FIGS. 10A and 10B are timing charts explaining operations of a display control device as a second related art disclosed in the Patent Reference 1.
Figure 10B:
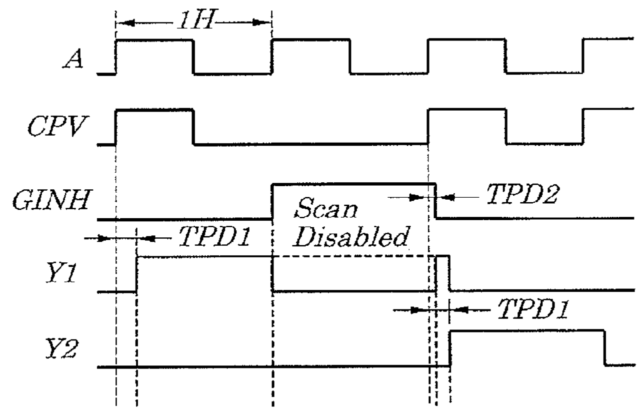
FIG. 10B (RELATED ART)

FIG. 7 is a block diagram showing configurations of the timing controller 14A of FIG. 6. The timing controller 14A includes a horizontal/vertical synchronization control signal outputting section 14*d* and a status signal transmitting section 14*e* both having functions different from those of the horizontal/vertical synchronization control signal outputting section 14*b* and status signal transmitting section 14*c* in FIG. 2. The status signal judging section 14*e*, when the status signal "st" is outputted from the peripheral circuit 15A, judges the timing using the status signal "st" and starts operations to drive the horizontal/vertical synchronization control signal outputting section 14*d*, in a manner to respond to the horizontal synchronizing signal stop period setting mode.

In the liquid crystal display device of the second exemplary embodiment, when the status signal "st" is outputted from the peripheral circuit 15A, the horizontal synchronizing signal stop period setting mode processing being the same as in the first exemplary embodiment is started by the timing controller 14A (status signal judging processing). When the status signal judging section 14*e* judges that the timing of the blank insertion (that is, timing of receiving and transmitting data) has come, if the judged timing is, for example, at an M-th line, VCK and STB signals are inserted in the M-th line for 1H (Horizontal) blank period and, as a result, writing to a pixel SPi,j is stopped for a 1H period. This causes changes in current occurring at the time of writing to disappear and then the occurrence of noises occurring in synchronization with the current change to stop.

Thus, according to the second exemplary embodiment, when the status signal "st" is outputted from the peripheral circuit 15A, the horizontal synchronizing signal stop period setting mode is driven by the timing controller 14A, whereby usability, in addition to advantages of the first exemplary embodiment, is improved.

While the invention has been particularly shown and described with reference to exemplary embodiments thereof, the invention is not limited to these exemplary embodiments. For example, when the increase in the number of times of transmission and receipt of data in the peripheral circuit 15 is needed, for example, by inserting a blank a plurality of numbers of times within the 1V period, the above increase can be achieved. The length of the blank to be inserted and the number of times of the blank insertion in the 1V period can be increased within a range not exceeding the original blank period (non-displayed period b).

Moreover, when the data driving section 12 drives the liquid crystal panel 11 with AC current, the driving method is not limited to the dot inversion driving method and the liquid crystal panel 11 can be driven by inverting, in accordance with the polarity inversion control signal POL, the phase of the pixel data Di to be written to the common voltage to be applied to the common electrode COM or the phase of the pixel data Di to be written to the data electrode Xi and, therefore, a frame inversion method or 2H inversion driving method can be also employed. In the 2H inversion driving method, the data driving section 12 inverts the phase of the common voltage or pixel data Di for every vertical two dots.

The present invention can be applied to a general liquid crystal display device where a circuit for receiving and transmitting data is mounted in the interior of or in an area surrounding the liquid crystal panel.

What is claimed is:

1. A liquid crystal display device comprising:

a liquid crystal panel having a predetermined number of columns of data electrodes, a predetermined number of rows of scanning electrodes, pixels each being mounted at an intersection of each of said data electrodes and each of said scanning electrodes, common data electrodes each operating as a facing electrode of each of said pixels;

a data driving section to write corresponding pixel data to each of said data electrodes based on a video signal strobe signal provided for every one horizontal period and to drive said liquid crystal panel with AC (Alternating Current) current in a predetermined manner based on a polarity inversion control signal provided for every one horizontal period;

a gate driving section to output a scanning signal that synchronizes to a vertical synchronizing signal provided for every one vertical period and to drive each of said scanning electrodes in a predetermined order based on a vertical drive clock signal provided for every one horizontal period; and a control unit to output said video signal strobe signal and said polarity inversion control signal to said data driving section based on a video signal and to output said vertical synchronizing signal and said vertical drive clock signal to said gate driving section;

wherein said one vertical period includes a blank period and a display period, and wherein said control unit provides a horizontal synchronizing signal stop period setting mode which sets a delay period in which outputting of a horizontal synchronizing signal comprising said video signal strobe signal and said vertical drive clock signal is delayed by X horizontal periods at least one time (X being a real number which is greater than zero) during said display period in said one vertical period, and shortens said blank period by a length of time equal to said delay period in said one vertical period.

2. The liquid crystal display device according to claim 1, wherein said control unit provides said horizontal synchronizing signal stop period setting mode which sets said delay period in which outputting of said horizontal synchronizing signal is delayed by two horizontal periods at least one time during a display period in said one vertical period.

3. The liquid crystal display device according to claim 1, wherein said control unit, in said horizontal synchronizing signal stop period setting mode, outputs, to said gate driving section, a gate mask signal to stop outputting of the scanning signal for a period being shorter than (1+X) horizontal periods which is defined as a stop period of said horizontal synchronizing signal.

4. The liquid crystal display device according to claim 1, wherein said control unit, in said horizontal synchronizing signal stop period setting mode, sustains a logic level of a polarity inversion control signal during part or all of said delay period of said horizontal synchronizing signal.

5. The liquid crystal display device according to claim 1, wherein an electronic circuit is provided as an integrated circuit and/or as a peripheral circuit of said liquid crystal display panel, which performs a predetermined operation in accordance with a given first signal and wherein said control unit has a signal transmitting section to transmit, in said horizontal synchronizing signal stop period setting mode, said first signal indicating that outputting of said horizontal synchronizing signal is in a stop state.

6. The liquid crystal display device according to claim 1, wherein an electronic circuit is provided as an integrated circuit and/or as a peripheral circuit of said liquid crystal display panel, which outputs a second signal indicating that said electronic circuit is in a ready state of performing an operation when a predetermined operation is to be performed and wherein said control unit has a signal judging section which, when said second signal is outputted from said electronic circuit, starts said operation corresponding to said horizontal synchronizing signal stop period setting mode.

7. A timing controller to be used in a liquid crystal display device comprising:

- a liquid crystal panel having a predetermined number of columns of data electrodes, a predetermined number of rows of scanning electrodes, pixels each mounted at an intersection of each of said data electrodes and each of said scanning electrodes, and common electrodes each operating as a facing electrode of each of said pixels, a data driving section to write pixel data to each of said data electrodes based on a video signal strobe signal provided for every one horizontal period and to drive said liquid crystal panel with AC (Alternating Current) current in a predetermined manner based on a polarity inversion control signal provided for every one horizontal period, and a gate driving section to output a scanning signal that synchronizes to a vertical synchronizing signal provided for every one vertical period and drives each of said scanning electrodes in a predetermined order in accordance with a vertical drive clock signal provided for every one horizontal period, said one vertical period including a blank period and a display period;
- wherein said video signal strobe signal and polarity inversion control signal are outputted to said data driving section based on a video signal and said vertical synchronizing signal and vertical drive clock signal are outputted to said gate driving section and a horizontal synchronizing signal stop period setting mode is provided to set a delay period during which outputting of a horizontal synchronizing signal comprising said video signal strobe signal and vertical drive clock signal is delayed by X horizontal periods at least one time (X being a real number which is greater than zero) in said display period within said one vertical period, and shortens said blank period by a length of time equal to said delay period set during said display period in said one vertical period.

8. The timing controller according to claim 7, wherein said horizontal synchronizing signal stop period setting mode is provided to set said delay period in which outputting of said horizontal synchronizing signal is delayed by two horizontal periods at least one time during a display period in said one vertical period.

9. The timing controller according to claim 7, wherein, in said horizontal synchronizing signal stop period setting mode, a gate mask signal to stop outputting of said scanning signal for a period being shorter than (1+X) horizontal periods which is defined as a stop period of said horizontal synchronizing signal is outputted to said gate driving section.

10. The timing controller according to claim 7, wherein, in said horizontal synchronizing signal stop period setting mode, a logic level of said polarity inversion control signal is sustained for part or all of said delay period of said horizontal synchronizing signal.

11. The timing controller according to claim 7, wherein an electronic circuit is provided as an integrated circuit and/or as a peripheral circuit of said liquid crystal display panel, which performs a predetermined operation in accordance with a given first signal and wherein a signal transmitting section is mounted which, in said horizontal synchronizing signal stop period setting mode, transmits, to said electronic circuit, said first signal indicating that outputting of said horizontal signal is in a stop state.

12. The timing controller according to claim 7, wherein an electronic circuit is provided as an integrated circuit and/or as a peripheral circuit of said liquid crystal display panel, which outputs a second signal indicating that said electronic circuit is in a ready state of performing an operation when a predetermined operation is to be performed and wherein a signal judging section, when said second signal is outputted from said electronic circuit, starts operations corresponding to said horizontal synchronizing signal stop period setting mode.

13. A signal processing method to be used in a liquid crystal display device comprising a liquid crystal panel having a predetermined number of columns of data electrodes, a predetermined number of rows of scanning electrodes, pixels each mounted at an intersection of each of said data electrodes and each of said scanning electrodes, and common electrodes each operating as a facing electrode of each of said pixels, a data driving section, a gate driving section, and a control unit, the signal processing method comprising:

- a processing in which said data driving section writes pixel data to each of said data electrodes based on a video signal strobe signal provided in every one horizontal period and drives said liquid crystal panel with AC (Alternating Current) current in a predetermined manner based on a polarity inversion control signal provided for every one horizontal period,
- a processing in which said gate driving section outputs a scanning signal that synchronizes to a vertical synchronizing signal provided for every one vertical period and drives each of said scanning electrodes in a predetermined order in accordance with a vertical drive clock signal provided for every one horizontal period, and
- a processing in which said control unit outputs, to said data driving section, said video signal strobe signal and polarity inversion control signal and outputs, to said gate driving section, said vertical synchronizing signal and vertical drive clock signal,
- wherein said one vertical period includes a blank period and a display period, and
- wherein said control unit outputs performs a horizontal synchronizing signal stop period setting processing in which a delay period is set during which said control unit delays outputting of a horizontal synchronizing signal comprising said video signal strobe signal and vertical drive clock signal by X horizontal periods at least one time (X being a real number which is greater than zero) during said display period in said one vertical period, and shortens said blank period by a length of time equal to said delay period set during said display period in said one vertical period.

14. The signal processing method according to claim 13, wherein, in said horizontal synchronizing signal stop period setting processing, said delay period is set during which said control unit delays outputting of said horizontal synchronizing signal by two horizontal periods at least one time during a display period in said one vertical period.

15. The signal processing method according to claim 13, wherein, in said horizontal synchronizing signal stop period setting processing, said control units outputs, to said gate driving section, a gate mask signal to stop outputting of said scanning signal for a period being shorter than (1+X) horizontal periods which is defined as a stop period of said horizontal synchronizing signal.

16. The signal processing method according to claim 13, wherein, in said horizontal synchronizing signal stop period setting processing, said control unit sustains a logic level of said polarity inversion control signal during part or all of said delay period of said horizontal synchronizing signal.

17. The signal processing method according to claim 13, wherein an electronic circuit is provided as an integrated circuit and/or as a peripheral circuit of said liquid crystal display panel, which performs a predetermined operation in accordance with a given signal and wherein, in said horizontal synchronizing signal stop period setting processing, said control unit performs signal transmitting processing to transmit said first signal indicating that outputting of said horizontal synchronizing signal is in a stop state.

18. The signal processing method according to claim 13, wherein an electronic circuit is provided as an integrated circuit and/or as a peripheral circuit of said liquid crystal display panel, which outputs a second signal indicating that said electronic circuit is in a ready state of performing an operation when a predetermined operation is to be performed and, wherein, when said second signal is outputted from said electronic circuit, said control unit performs a signal judging processing of starting said horizontal synchronizing signal stop period setting processing.

* * * * *